United States Patent
Lou et al.

(10) Patent No.: US 11,157,838 B2
(45) Date of Patent: Oct. 26, 2021

(54) MACHINE LEARNING MODELING FOR GENERATING CLIENT RESERVATION VALUE

(71) Applicant: Airbnb, Inc., San Francisco, CA (US)

(72) Inventors: Yin Lou, San Mateo, CA (US); Li Zhang, Palo Alto, CA (US)

(73) Assignee: Airbnb, Inc., San Francisco, CA (US)

( * ) Notice: Subject to any disclaimer, the term of this patent is extended or adjusted under 35 U.S.C. 154(b) by 561 days.

(21) Appl. No.: 15/660,163

(22) Filed: Jul. 26, 2017

(65) Prior Publication Data

US 2019/0034837 A1 Jan. 31, 2019

(51) Int. Cl.
G06Q 10/02 (2012.01)
G06F 16/22 (2019.01)
G06N 20/00 (2019.01)

(52) U.S. Cl.
CPC .......... G06Q 10/02 (2013.01); G06F 16/22 (2019.01); G06N 20/00 (2019.01)

(58) Field of Classification Search
CPC ......... G06Q 10/02; G06F 16/22; G06N 20/00
USPC ............................................................ 705/5
See application file for complete search history.

(56) References Cited

U.S. PATENT DOCUMENTS

| | | | |
|---|---|---|---|
| 6,360,205 B1 | 3/2002 | Iyengar et al. | |
| 2016/0098649 A1* | 4/2016 | Ifrach | G06Q 10/02 705/5 |
| 2016/0148237 A1* | 5/2016 | Ifrach | G06Q 10/02 705/7.31 |
| 2017/0178036 A1 | 6/2017 | Xu et al. | |

FOREIGN PATENT DOCUMENTS

| | | |
|---|---|---|
| CN | 111194453 A | 5/2020 |
| KR | 20200035979 A | 4/2020 |
| WO | WO-2019022863 A1 | 1/2019 |

OTHER PUBLICATIONS

Walek, Bogdan, et.al.; Proposal of Expert System for Hotel Booking System; 2016 (Year: 2016).*
"International Application Serial No. PCT US2018 038259, International Search Report dated Dec. 27, 2018", 2 pgs.
"International Application Serial No. PCT US2018 038259, Written Opinion dated Dec. 27, 2018", 4 pgs.
"International Application Serial No. PCT US2018 038259, International Preliminary Report on Patentability dated Feb. 6, 2020", 6 pgs.

* cited by examiner

*Primary Examiner* — George Chen
*Assistant Examiner* — Dione N. Simpson
(74) *Attorney, Agent, or Firm* — Schwegman Lundberg & Woessner, P.A.

(57) ABSTRACT

Systems and methods are provided for analyzing booking session data to generate a plurality of feature vectors for each booking session of the plurality of booking sessions, and generating training data comprising the plurality of feature vectors for each booking session and at least a first constraint. The systems and methods further providing for calculating a set of weights using the training data, wherein each weight is a lowest weight satisfying the most constraints possible, wherein the set of weights comprises a weight associated with each feature in the plurality of feature vectors, and computing a reservation value for each of a plurality of clients for each of a plurality of listings and for each date of a plurality of dates, based on the set of weights and the plurality of feature vectors.

20 Claims, 11 Drawing Sheets

| Feature | Weight | Feature | Weight |
|---|---|---|---|
| dim_has_wireless_internet | 1.34 | dim_allows_pets | -0.50 |
| m_is_neighborhood_too_small | -2.74 | m_neighborhood_availability | -0.30 |
| m_neighborhood_effective_daily_price_p05 | -3.97 | m_neighborhood_effective_daily_price_p25 | -2.53 |
| m_neighborhood_effective_daily_price_p50 | -2.01 | m_neighborhood_effective_daily_price_p75 | -1.21 |
| m_neighborhood_effective_daily_price_p95 | 1.53 | dim_is_sunday | 13.35 |
| dim_is_friday | 14.56 | dim_is_saturday | 14.40 |
| m_instant_bookings_ratio | 5.74 | dim_is_superhost | 0.49 |
| m_p05_guest_price_per_guest_per_night | -3.65 | m_p25_guest_price_per_guest_per_night | -3.46 |
| m_p50_guest_price_per_guest_per_night | -2.17 | m_p75_guest_price_per_guest_per_night | 0.00 |

FIG. 6

MACHINE LEARNING MODELING FOR GENERATING CLIENT RESERVATION VALUE

BACKGROUND

Machine learning technology is starting to be used to address a wide variety of technical issues, such as fraud prevention and detection, health care diagnosis and treatment, predicting industrial machine failures, predicting transportation industry issues, and so forth. With the advance in machine learning technology, there is an opportunity to utilize machine learning technology to address various technical problems in an online marketplace.

BRIEF DESCRIPTION OF THE DRAWINGS

Various ones of the appended drawings merely illustrate example embodiments of the present disclosure and should not be considered as limiting its scope.

FIG. 6 is a table illustrating weights generated by a model, according to some example embodiments.

DETAILED DESCRIPTION

Systems and methods described herein relate to machine learning technology and provide for generating a client reservation value in an online marketplace. For example, a client (e.g., guest or user) of an online reservation system for accommodations may be searching for accommodations (e.g., house, apartment, room, cabin, cottage, etc.) for a particular date (or date range). Each listing for each accommodation may have a particular listing price for that date, however, the client may value that listing at a different price based on a number of criteria specific to the client, which may not be easily discerned. Moreover, one client may value the listing at a different price from another client. For example, a first client may value the listing at $100 per night while a second client may value the same listing at $90 per night. Furthermore, a reservation system with hundreds of thousands, if not millions, of clients using the system, may need to determine a value to a client for each listing that the client views.

Systems and method described herein utilize machine learning technology to generate a client reservation value for one or more listings in the reservation system (e.g., to determine a client internal value of one or more listings). The client reservation value is the maximum amount (e.g., price) that a client is willing to pay for a particular listing for a particular night. The reservation value may be used to determine which listings, of a very high volume of listings, in which a client may be interested (e.g., to optimize search results for a client), determine a demand curve for a particular listing, and so forth.

For example, a server computing system may analyze booking session data related to an online reservation system for accommodations to generate feature vectors within or for each booking session. A booking session is associated with a particular client (e.g., guest or user) of the online reservation system. Each booking session may comprise a listing that was booked by the client, and one or more listings that were considered by the client, but not booked. From this analysis, the server computing system generates training data comprising the feature vectors for or within the booking sessions and one or more constraints. The server computer system uses the training data to train a model. The server computer system calculates a set of weights which are then used to compute a client reservation value for a client.

Figure 1:
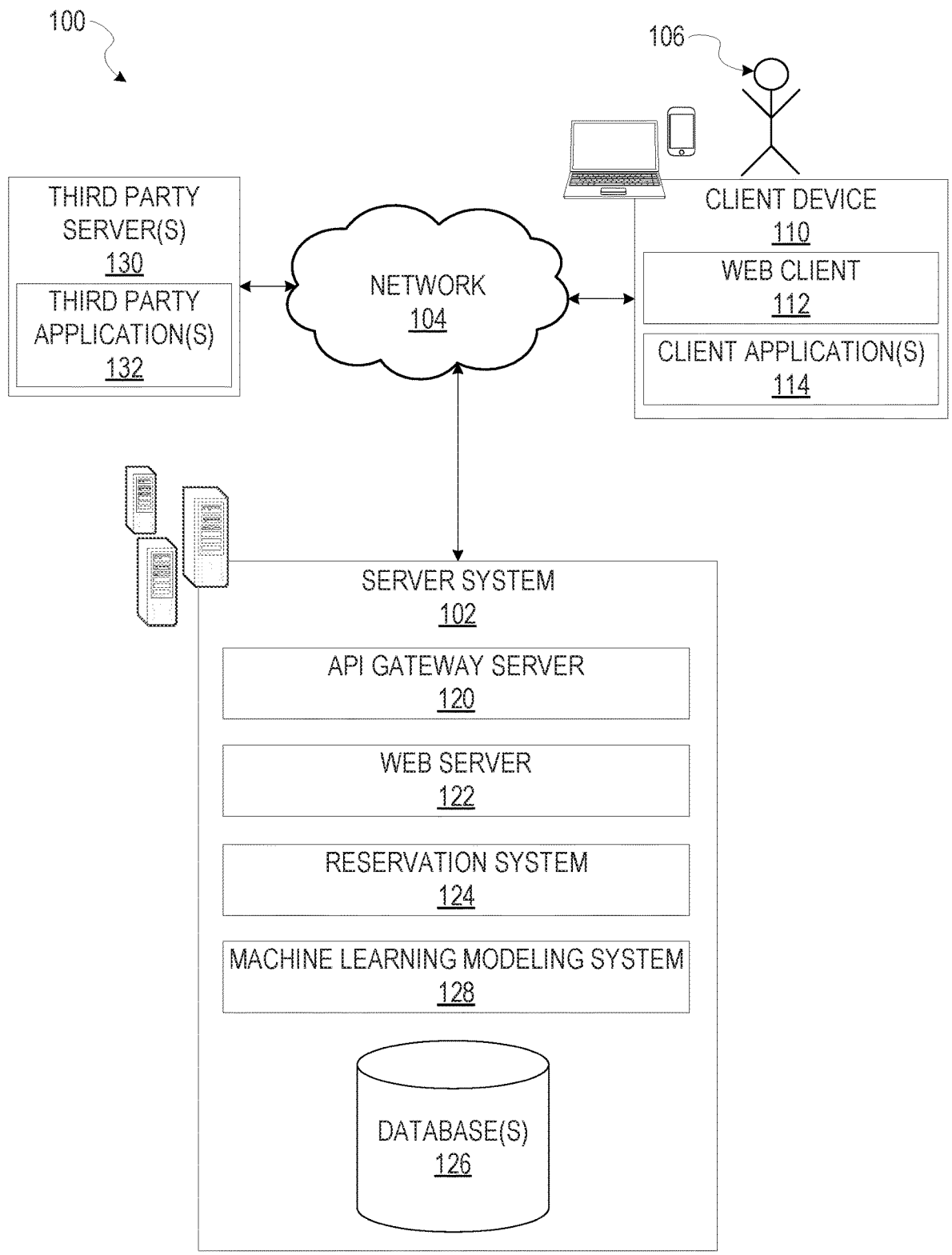
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request and receive reservation information, accommodation information, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alphanumeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, messaging application, electronic mail (email) application, an e-commerce site application, a mapping or location application, a reservation application, and the like.

In some embodiments, one or more client applications 114 may be included in a given one of the client device 110 and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access reservation information or listing information, to request data, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

The system 100 may further include one or more third party servers 130. The one or more third party servers 130 may include one or more third party application(s) 132. The one or more third party application(s) 132, executing on third party server(s) 130, may interact with the server system 102 via API gateway server 120 via a programmatic interface provided by the API gateway server 120. For example, one or more the third party applications 132 may request and utilize information from the server system 102 via the API gateway server 120 to support one or more features or functions on a website hosted by the third party or an application hosted by the third party. The third party website or application 132, for example, may provide various functionality that is supported by relevant functionality and data in the server system 102.

A server system 102 may provide server-side functionality via the network 104 (e.g., the Internet or wide area network (WAN)) to one or more third party servers 130 and/or one or more client devices 110. The server system 102 may be a cloud computing environment, according to some example embodiments. The server system 102, and any servers associated with the server system 102, may be associated with a cloud-based application, in one example embodiment.

In one example, the server system 102 provides server-side functionality for an online marketplace. The online marketplace may provide various listing for accommodations hosted by various managers which can be reserved by clients, such as for an apartment, a house, a cabin, one or more rooms in an apartment or house, and the like. For example, one manager or owner of a home may list one or more rooms in his own home on the online marketplace, a second manager of a home may list and entire home on the online marketplace, a third manager may list an entire cabin on the online marketplace, and so forth. In one example, the listings may be time-expiring inventory. With time-expiring inventory (e.g., time-expiring accommodations), if the inventory is not booked and used before it expires, the inventory is wasted and the manager receives no revenue.

The server system 102 may include an application program interface (API) gateway server 120, a web server 122, a reservation system 124, and a machine learning modeling system 128, that may be communicatively coupled with one or more databases 126 or other form of data stores.

The one or more databases 126 may be one or more storage devices that store data related to a reservation system 124, machine learning modeling system 128, and other systems or data. The one or more databases 126 may further store information related to third party servers 130, third party applications 132, client devices 110, client applications 114, users 106, and so forth. The one or more databases 126 may be implemented using any suitable database management system such as MySQL, PostgreSQL, Microsoft SQL Server, Oracle, SAP, IBM DB2, or the like. The one or more databases 126 may include cloud-based storage, in some embodiments.

The reservation system 124 may manage resources and provide back-end support for third party servers 130, third party applications 132, client applications 114, and so forth, which may include cloud-based applications. The reservation system 124 may provide functionality for viewing listings (e.g., accommodation listings), managing listings, booking listings and other reservation functionality, and so forth, for an online marketplace. Further details related to the reservation system 124 are shown in FIG. 2.

Figure 2:
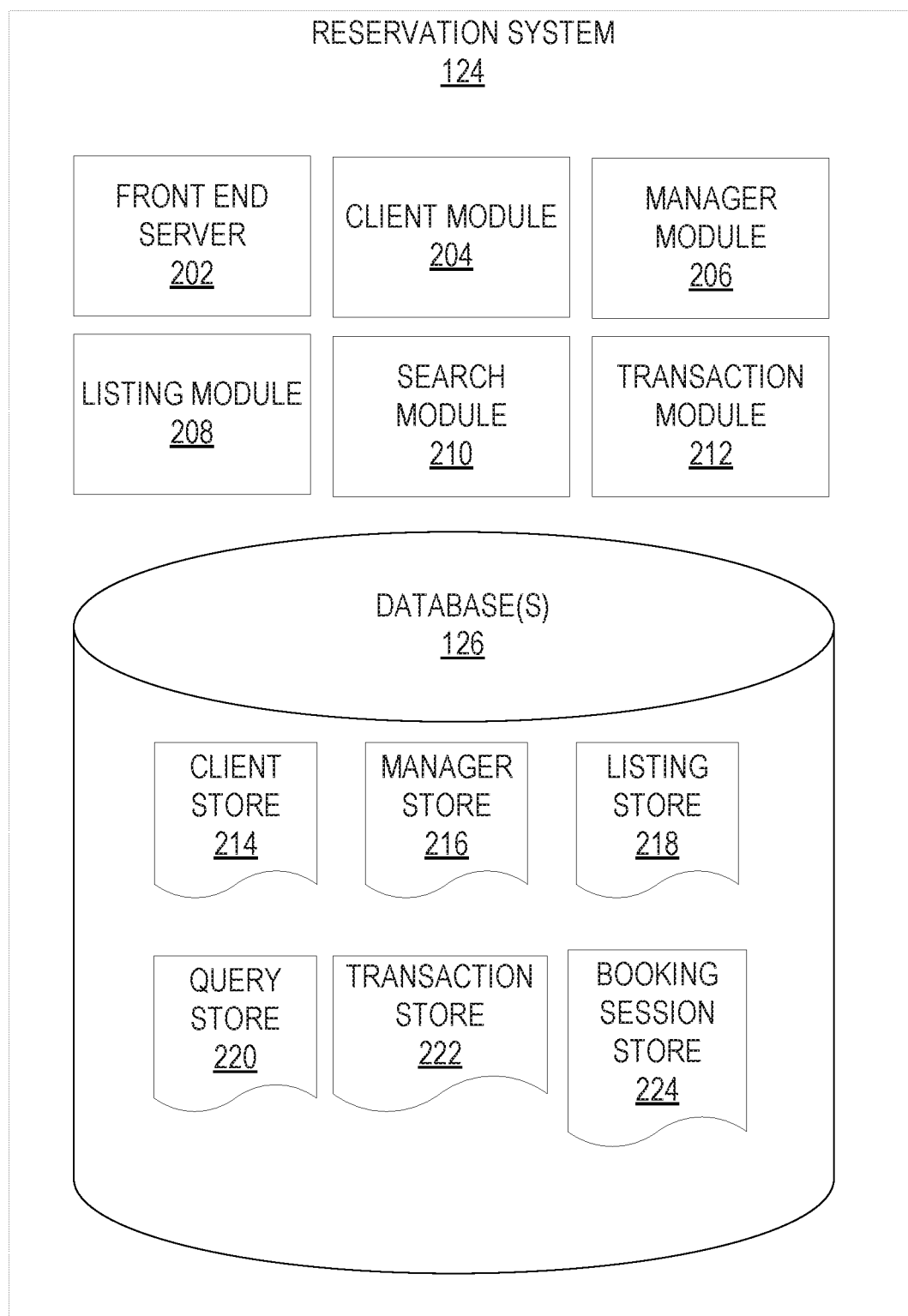
FIG. 2 is a block diagram illustrating a reservation system, according to some example embodiments.

FIG. 2 is a block diagram illustrating a reservation system 124, according to some example embodiments. The reservation system 124 comprises a front end server 202, a client module 204, a manager module 206, a listing module 208, a search module 210, and a transaction module 212. The one or more database(s) 126 include a client store 214, a manager store 216, a listing store 218, a query store 220, a transaction store 222, and a booking session store 224. The reservation system 124 may also contain different and/or other modules that are not described herein.

The reservation system 124 may be implemented using a single computing device or network of computing devices, including cloud-based computer implementations. The computing devices may be server class computers including one or more high-performance computer processors and random access memory, which may run an operating system such as LINUX or the like. The operations of the reservation system 124 may be controlled through either hardware or through computer programs installed in non-transitory computer readable storage devices such as solid-state devices or magnetic storage devices and executed by the processors to perform the functions described herein.

The front end server 202 includes program code that allows client and manager client devices 110 to communicate with the reservation system 124. The front end server 202 may utilize the API gateway server 120 and/or the web server 122 shown in FIG. 1. The front end server 202 may include a web server hosting one or more websites accessible via a hypertext transfer protocol (HTTP), such that user agents, such as a web browser software application may be installed on the client devices 110, and can send commands and receive data from the reservation system 124. The front and server 202 may also utilize the API gateway server 120 that allows software applications installed on client devices 110 to call to the API to send commands and receive data from the reservation system 124. The front end server 202 further includes program code to route commands and data to the other components of the reservation system 124 to carry out the processes described herein and respond to the client devices 110 accordingly.

The client module 204 comprises program code that allows clients (also referred to herein as "users" or "guests") to manage their interactions with the reservation system 124, and executes processing logic for client related information that may be requested by other components of the reservation system 124. Each client is represented in the reservation system 124 by an individual client object having a unique client ID and client profile, both which are stored in the client store 214.

The client profile includes a number of client related attribute fields that may include a profile picture and/or other identifying information, a geographical location, a client calendar, and so forth. The client's geographic location is either a client's current location (e.g., based on information provided by the client device 110), or their manually entered home address, neighborhood, city, state, or country of residence. The client location may be used to filter search criteria for time expiring inventory relevant to a particular client or assign default language preferences. The client attributes or features are further described below.

The client module 204 provides code for clients to set up and modify the client profile. The reservation system 124 allows each client to communicate with multiple managers. The reservation system 124 allows a client to exchange communications, request for transactions, and perform transactions with managers.

The manager module 206 comprises program code that provides a user interface that allows managers (also referred to herein as "hosts" or "owners") to manage their interactions and listings with the reservation system 124 and executes processing logic for manager related information that may be requested by other components of the reservation system 124. Each manager is represented in the reservation system 124 by an individual manager object having a unique manager ID and manager profile, both of which are stored in manager store 216.

The manager profile is associated with one or more listings owned or managed by the manager, and includes a number of manager attributes including transaction requests and a set of listing calendars for each of the listings managed by the manager. The client attributes or features are further described below.

The manager module 206 provides code for managers to set up and modify the manager profile listings. A user 106 of the reservation system 124 can be both a manager and a client. In this case, the user 106 will have a profile entry in both the client store 214 and the manager store 216 and be represented by both a client object and a manager object. The reservation system 124 allows the manager to exchange communications, respond to requests for transactions, and conduct transactions with other managers.

The listing module 208 comprises program code for managers to list time expiring inventory for booking by clients. The listing module 208 is configured to receive the listing from a manager describing the inventory being offered, a timeframe of its availability including one or more of the start date, and dates, start time, and an end time, a price, a geographic location, images and description that characterize the inventory, and any other relevant information. For example, for an accommodation reservation system, a listing may include a type of accommodation (e.g., house, apartment, room, sleeping space, or other), a representation of its size (e.g., square footage, or number of rooms), the dates that the accommodation is available, and a price (e.g., per night, per week, per month, etc.). The listing module 208 allows a user 106 to include additional information about the inventory, such as videos, photographs and other media.

The geographical location associated with the listing identifies the complete address, neighborhood, city, and/or country of the offered listing. The listing module 208 is also capable of converting one type of location information (e.g., mailing address) into another type of location information (e.g., country, state, city, and neighborhood) using externally available geographical map information.

The price of the listing is the amount of money a client needs to pay in order to complete a transaction for the inventory. The price may be specified as an amount of money per day, per week, per day, per month, and/or per season, or other interval of time specified by the manager. Additionally, price may include additional charges such as accommodation inventory, cleaning fees, pet fees, service fees, and taxes, or the listing price may be listed separately from additional charges. The listing attributes or features are further described below.

Each listing is represented in the reservation system 124 by a listing object which includes the listings information as provided by the manager and a unique listing ID, both of which are stored in the listing store 218. Each listing object is also associated with the manager object for the manager providing the listing.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). For example, a manager may access the listing calendar for listing, and manually indicate which time intervals that the listing is available for transaction by a client, which time intervals are blocked is not available by the manager, and which time intervals are already in transaction (e.g., booked) for a client. In addition, the listing calendar continues to store historical information as to the availability of the listing identifying which past time intervals were booked by clients, blocked, or available. Further, the listing calendar may include calendar rules (e.g., the minimum and maximum number of nights allowed for the inventory, a minimum or maximum number of nights needed between bookings, etc.). Information from each listing calendar is stored in the listing store 218.

The search module 210 comprises program code configured to receive an input search query from a client and return a set of time expiring inventory and/or listings that match the input query. Search queries are saved as query objects stored by the reservation system 124 in the query store 220. A query may contain a search location, a desired start time/date, a desired duration, a desired listing type, and a desired price range, and may also include other desired attributes or features of the listing. A potential client need not provide all the parameters of the query listed above in order to receive results from search module 210. The search module 210 provides a set of time-expiring inventory and/or listings in response to the submitted query to fulfill the parameters of the submitted query. The online system may also allow clients to browse listings without submitting a search query, in which case the viewing data recorded will only indicate that a client has viewed the particular listing without any further details from the submitted search query. Upon the client providing input selecting a time expiring inventory/listing to more carefully review for possible transaction, the search module 210 records the selection/viewing data indicating which inventory/listing the client viewed. This information is also stored in the query store 220.

The transaction module 212 comprises program code configured to enable clients to submit a contractual transaction request (also referred to as formal requests) to transact for time expiring inventory. In operation, the transaction module 212 receives a transaction request from a client to transact for an item of time expiring inventory, such as a particular date range for a listing offered by a particular manager. A transaction request may be a standardized request form that is sent by the client, which may be modified by responses to the request by the manager, either accepting or denying a received request form, such that the agreeable terms are reached between the manager and the client. Modifications to a received request may include, for example, changing the date, price, or time/date range (and thus, effectively, which time expiring inventories is being transacted for). The standardized forms may require the client to record the start time/date, duration (or end times), or any other details that must be included for an acceptance to be binding without further communication.

The transaction module 212 receives the filled out form from the client and presents the completed request form including the booking parameters to the manager associated with the listing. The manager may accept the request, reject the request, or provide a proposed alternative that modifies one or more of the parameters. The manager accepts the request (or the client accepts the proposed alternative), then the transaction module 212 updates an acceptance status associated with the request and the time-expiring inventory to indicate that the request was accepted. The client calendar and the listing calendar are also updated to reflect that the time-expiring inventory has been transacted for particular time interval. Other models not specifically described herein allow the client to complete payment, and for the manager to receive payment.

The transaction store 222 stores request made by clients. Each request is represented by a request object. The request includes a timestamp, a requested start time, and a requested duration or reservation end time. Because the acceptance of a booking by a manager is a contractually binding agreement with the client that the manager will provide the time-expiring inventory to the client at the specified times, all the information that the manager needs to approve such an agreement is included in the request. A manager response to a request is comprised of a value indicating acceptance or denial and a timestamp. Other models may allow for instant booking, as described below.

The transaction module 212 may also provide managers and clients with the ability to exchange informal requests to transact. Informal requests are not sufficient to be binding upon the client or manager if accepted, and in terms of content, may vary from mere communications and general inquiries regarding the availability of inventory, to requests that fall just short of whatever specific requirements the reservation system 124 sets forth for formal transaction requests. The transaction module 212 may also store informal requests in the transaction store 222, as both informal and formal requests provide useful information about the demand for time-expiring inventory.

The booking session store 224 stores booking session data for all booking sessions performed by clients. Booking session data may include details about a listing that was booked and data about one or more other listings that were viewed (or seriously considered) but not booked by the client before booking the listing. For example, once a listing is booked, the transaction module 212 may send data about the listing, the transaction, viewing data that was recorded for the booking session, and so forth, to be stored in the booking session store 224. The transaction module 212 may utilize other modules or data stores to generate booking session data to be stored in the booking session store 224.

Returning to FIG. 1, the machine learning modeling system 128 provides functionality for capturing and analyzing data (e.g., booking session data from the reservation system 124), generating training data, training models (e.g., for generating a user reservation price), computing a reservation value for a plurality of users 106 of reach of a plurality of listings, and so forth.

Figure 3:
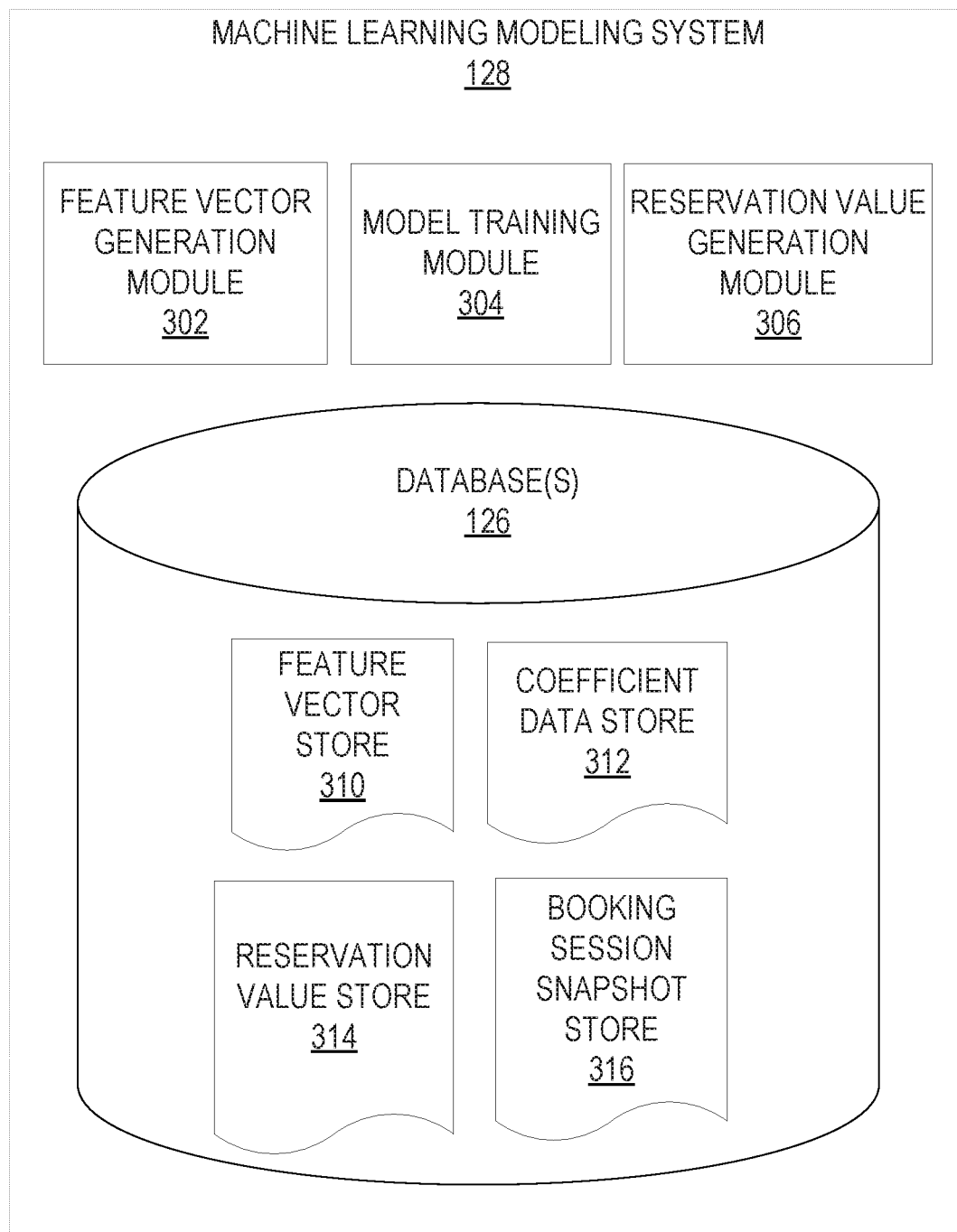
FIG. 3 is a block diagram illustrating a machine learning modeling system, according to some example embodiments.

FIG. 3 is a block diagram illustrating a machine learning modeling system 128, according to some example embodiments. The machine learning modeling system 128 comprises a feature vector generation module 302, a model training module 304, and a reservation value generation module 306. The one or more database(s) 126 include a feature vector store 310, a coefficient data store 312, a reservation value store 314, and a booking session snapshot store 316. The machine learning modeling system 128 may also contain different and/or other modules that are not described herein.

The machine learning modeling system 128 may be implemented using a single computing device or network of computing devices, including cloud-based computer implementations. The computing devices may be server class computers including one or more high-performance computer processors and random access memory, which may run an operating system such as LINUX or the like. The operations of the machine learning modeling system 128 may be controlled through either hardware or through computer programs installed in non-transitory computer readable storage devices such as solid-state devices or magnetic storage devices and executed by the processors to perform the functions described herein.

The feature vector generation module 302 comprises program code that provides functionality to generate feature vectors for a booking session. For example, the feature vector generation module 302 may capture a snapshot of booking session data from one or more databases 126 (e.g., from booking session store 224) for a period of time (e.g., one day, one week, one month, one year, etc.). The feature vector generation module 302 may store the snapshot of booking session data in the booking session snapshot store 316. The feature vector generation module 302 may then generate feature vectors for each booking session in the snapshot of booking session data. In one example, each booking session comprises a booked listing and at least one unbooked listing that was considered by a client in a session that resulted in booking the booked listing. For this example, the feature vector generation module 302 would generate a feature vector for the booked listing and a feature vector for each of the unbooked listings that were considered by the client in the session that resulted in the booked listing. The feature vectors are stored in the feature vector store 310.

The model training module 304 comprises program code that provides functionality to generate training data comprising the feature vectors for each booking session. The training data may include one or more constraints. One example constraint includes that a reservation value associated with a feature vector for a booked listing is not less than an actual booked value. Another example constraint includes that a reservation value associated with a feature vector for an unbooked listing is greater than a listed value of the unbooked listing.

The model training module 304 further provides functionality to calculate a set of weights (or coefficients) using the training data wherein each weight is as small as possible while satisfying the most constraints as possible (e.g., a lowest weight satisfying the most constraints as possible). In one example, the set of weights comprises a weight associated with each feature in the plurality of feature vectors. The trained model comprising the set of weights is stored in the coefficient data store 312.

The reservation value generation module 306 provides functionality to compute a reservation value of a listing for a particular client for a particular date. The computed reservation value is stored in the reservation value store 314. The computed reservation value may be used for generating a demand curve, for search ranking, and so forth, as described further below.

Figure 4:
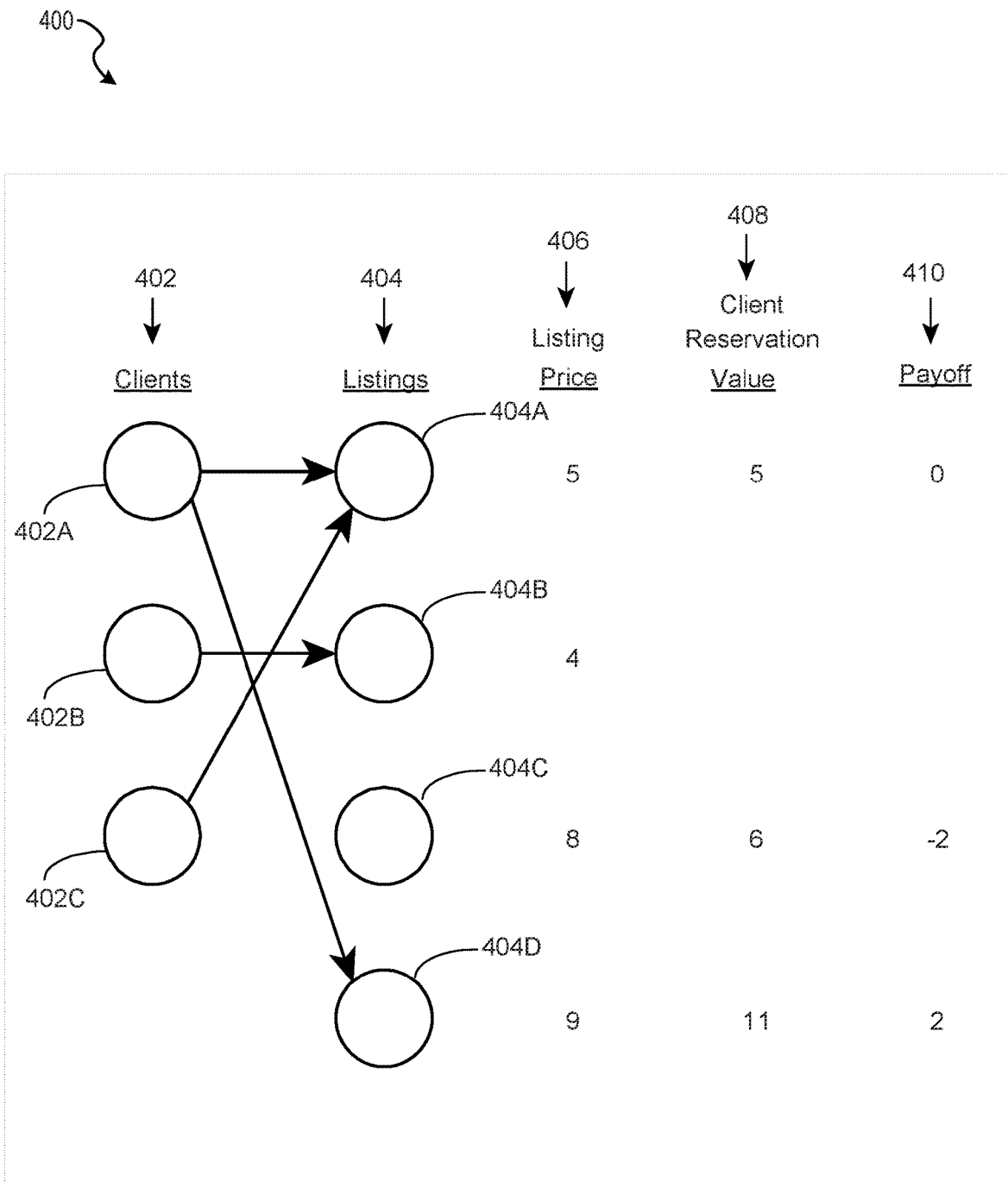
FIG. 4 is a bipartite graph illustrating an edge between clients and listings, according to some example embodiments.

FIG. 4 is a diagram 400 illustrating an accommodation marketplace for a particular date. In the simple example shown in FIG. 4, there are a number of clients 402 (e.g., guests) 402A, 402B, and 402C, and a number of listings 404 (e.g., accommodations) 404A, 404B, 404C. Each listing has a price 406, a client reservation value 408, and a payoff 410. A reservation value is the highest price that a client (e.g., user or guest) is willing to pay for a particular listing on a particular night (e.g., date). For simplicity, only the client reservation value 408 and payoff 410 for client 402A is shown. In this example, there is an edge between a client 402 and a listing 404 if the client's reservation value on that listing is larger than the listing price.

In one example, a reservation price or value (e.g., client reservation value 408) is modeled as a function of guest (e.g., client), listing, and night (e.g., date): RP(guest, listing, night)=F(guest features, listing features, host features, night features) where F is an unknown function that maps the feature vector to a real value. For example, a reservation value for client 402A for listing 404A is $5, for listing 404C is $6, and for listing 404 D is $11. In the bipartite graph of FIG. 4, there are edges connecting client 402A with the listings 404A and 404D, but not for 404C.

In one example, a payoff is the reservation value (e.g., client reservation value 408) minus the listed price for the listing. In one example, it may be assumed that a rational guest will not book a listing with a negative payoff and that a guest is looking to maximize his or her own payoff. Accordingly, in the example in FIG. 4, client 402A will choose (e.g., book) the 404D listing since the payoff 410 is maximized.

Figure 5:
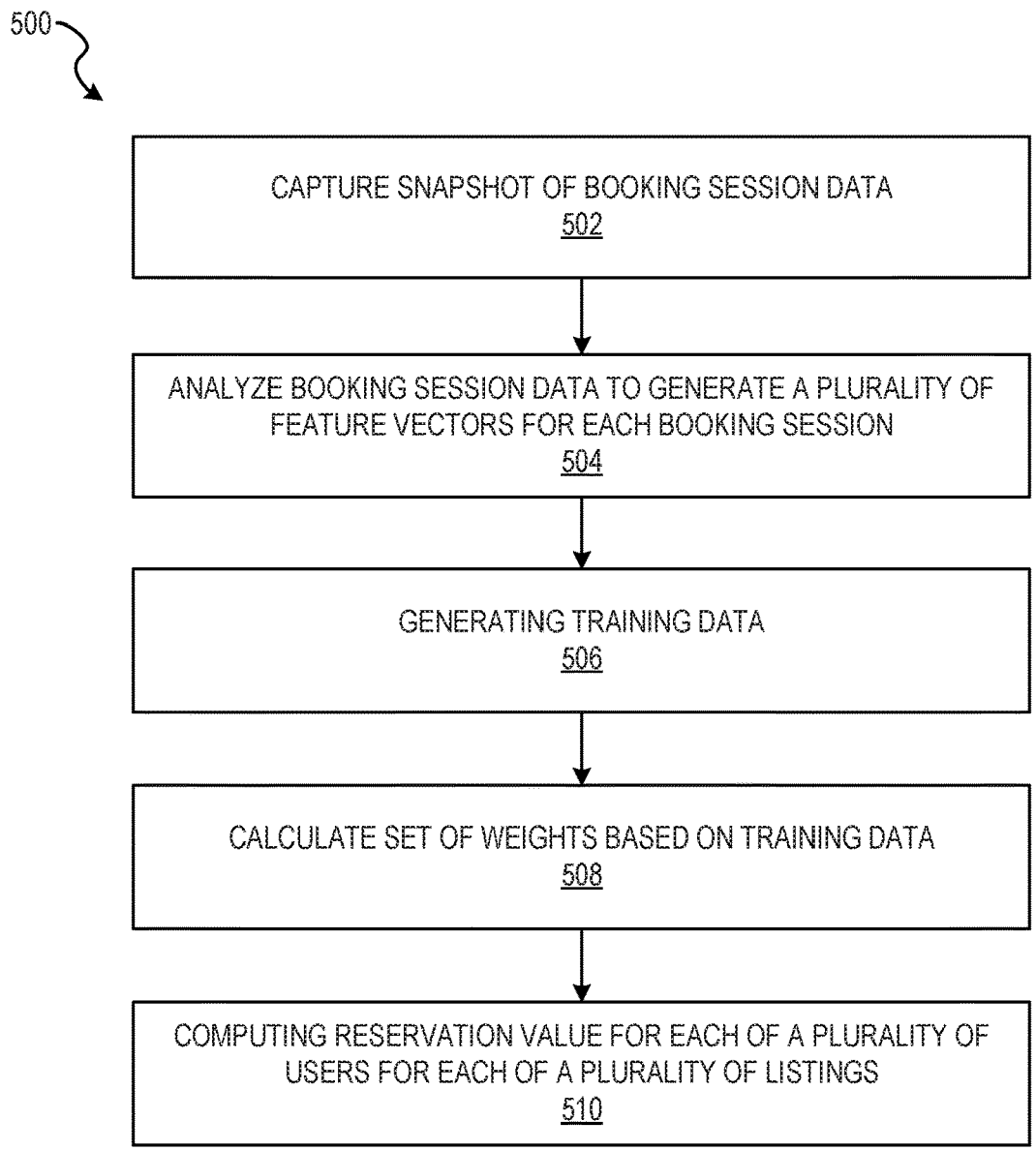
FIG. 5 is a flow chart illustrating aspects of a method, according to some example embodiments.

FIG. 5 is a flow chart illustrating aspects of a method 500, for modeling a reservation value for a client, according to some example embodiments. For illustrative purposes, method 500 is described with respect to the networked system 100 of FIG. 1 and FIGS. 2-3. It is to be understood that method 500 may be practiced with other system configurations in other embodiments.

In operation 502, a server computing system (e.g., server system 102 or machine learning modeling system 128) captures a snapshot of booking session data that is stored in one or more databases 126 (e.g., in booking session store 224). For example, the server computing system may access the booking session store 224 to capture booking session data for a particular time period (e.g., the last year, month, week, day, etc.). The server computing system stores the snapshot of booking session data in one or more databases 126 (e.g., in booking session snapshot store 316).

In one example, each booking session may comprise a booked listing, which is the listing that the client actually booked during the booking session, and at least one unbooked listing, which is a listing that a client viewed or considered, but did not book during the booking session. The unbooked listings in the listing session may comprise all of the listings the client viewed, or only the listings the client seriously considered. For example, the system may capture the listings that the client recently viewed prior to booking the listing (e.g., listings viewed the same day or the previous day) and how many times the client viewed the listings (e.g., just once, at least twice, etc.), and then remove random noise, to determine one or more listings considered as a serious candidate for booking. The listings determined a serious candidate for booking would be captured as the unbooked listings for that booking session.

The booking session data may further comprise various features, such as guest features, night features, listing features, listing manager (e.g., host) features, and so forth. Guest features may include the client location (e.g., county where the client resides, residential address, etc.), number of past bookings, percentage of past instant bookable bookings, statistics of dollar amount paid per guest per night (such as minimum, maximum, average, $25^{th}$ percentile, median, $75^{th}$ percentile, etc.), and so forth. Night features may include whether or not the night is a weekend night or weekday night, whether the night is a holiday, average or median listed prices in the same market and in the previous year, and so forth.

Listing features may include location, proximity to popular attractions (e.g., beach, museum, amusement park, conference center, etc.), amenities (e.g., WiFi, pool, hot tub, any included meals, TV, cable, coffee maker, full kitchen, partial kitchen, whether pets are allowed, parking, workspace, iron, hair dryer, shampoo, heating, air conditioning, washer and dryer, private entrance, elevator, smoking, gym, etc.), number rooms, number of beds, number of bathrooms, property type (e.g., house, apartment, cabin, cottage, etc.), room type (e.g., entire home/apartment, private room, shared room, etc.), self check-in, kid friendly, price, cleaning fee, security deposit, other fees, and so forth. Host features may include whether the listing manager is a superhost (e.g., has been consistently rated highly by guests), whether the listing may be instantly booked or requires approval from the listing manager, and so forth.

In one example, a server computing system (e.g., server system 102 or machine learning modeling system 128) may also capture a snapshot of client data that is stored in one or more databases 126 (e.g., in client store 214), host or manager data that is stored in one or more databases 126 (e.g., manager store 216), and/or listing data that is stored in one or more databases 126 (e.g., in listing store 218). For example, the server computing system may access the client store 214 to capture client data for a particular time period (e.g., the last year, month, weeks, day, etc.), and may access the manager store 216 to capture manager data for a particular time period (e.g., the last year, month, weeks, day, etc.), and may access the listing store 218 to capture listing data for a particular time period (e.g., the last year, month, week, day, etc.). The server computing system stores the snapshot of client data, manager data, and/or listing data in one or more databases 126. The particular time period may be the same for all captured data (e.g., booking session snapshot, client data snapshot, manager data snapshot, listing data snapshot).

In operation 504, the server computer system analyzes booking session data (e.g., from the snapshot of booking session data) to generate a plurality of feature vectors for each booking session of the plurality of booking sessions. The feature vectors may comprise all of the available features in the booking session data, or a set of features of interested may be predetermined. The server computer system may further access the client data, manager data, and listing data, and other data, as needed to generate the plurality of feature vectors.

Using a simple example for illustration, a particular booking session may comprise three listings, a listing A that was booked, and a listing B and C that were unbooked. For each listing A, B, and C, there may be a guest feature vector $x_g$, a listing feature vector $x_A$, and a night feature vector $X_n$. In this simple example, $x_g$ may include a feature $x_{g1}$ that is the country in which the guest resides, $x_A$ may include a feature $x_{A1}$ that is WiFi, and $x_n$ may include a feature $x_{n1}$ that is whether or not the night is a holiday. Thus, the feature vectors for listing A, B, and C, may comprise:

Listing A: $(x_g, x_A, x_n)$
Listing B: $(x_g, x_B, x_n)$
Listing C: $(x_g, x_C, x_n)$ In one example, the plurality of feature vectors are stored in one or more databases 126 (e.g., in feature vector store 310). In one example, the plurality of feature vectors are put together into a single feature vector and the single feature vector is stored in the feature vector store 310.

In operation 506, the server computer system generates training data. In one example, the training data may comprise the plurality of feature vectors and one or more constraints. For example, one constraint may be where a reservation value associated with a feature vector for a booked listing is not less than an actual booked value, and another constraint may be where a reservation value associated with a feature vector for an unbooked listing is greater than a listed value of the unbooked listing.

In one example, the server computer system generates training data by formulating an optimization problem. In one example, the optimization problem is a convex formulation, and thus, an optimal solution is guaranteed to be found (global minima is be found). Accordingly, a set of weights will be found which will be guaranteed to give a minimized value.

First, a function RP is parameterized as a linear combination of the features in order to obtain deeper insights from the model, and for intelligibility. The input features may not necessarily be the original features, but may be bucketized binary features, and feature interactions may be encoded. Nevertheless, the function $RP(x)=W^T x$ may be used.

An evaluation metric may be used, such a 75th percentile of booking regret on a booked case, as a main metric. This may be used because when the estimated client reservation value is larger than the listing price, it is 100% correct, as the assumption is client reservation value should be larger than the listing price. When a booking occurs, but the estimated reservation value is lower than the listing price, there will be a booking regret. The 75th percentile of such a booking regret captures the "maximum" regret on a booked case by filtering out outliers.

In one example of experiments conducted using systems and models described herein, training data was generated using one year's worth of booking sessions, covering all nights. In this experiment, a U.S. model was built to automatically encode interactions between country and all other features (e.g., these are important interactions since different countries have different holidays and therefore different nights will be affected).

In this example experiment, the soft margin models (described below) were evaluated. Training data was sampled from Sep. 1, 2015 to Dec. 31, 2016 on listings in the U.S. There were approximately 3400 features after feature transformation and encoding. Some examples of feature transformation include applying log function to number of past bookings of a guest (e.g., standard approach in linear model dealing with count features. For each day, at most 5000 reservations were sampled, and each reservation contained one positive sample (e.g., a booked listing by a client) and one sampled negative sample (e.g., a listing that was viewed but not booked by a client). The data was further divided into training, validation, and test sets, where each set contains guests and listings that are not visible to other sets.

In this example experiment, on the test set, the booking regret was:

| Booking Regret 25th | Booking Regret 50th | Booking Regret 75th |
|---|---|---|
| $2.82 | $6.48 | $14.82 |

And the non-booking regret was:

| Non-Booking Regret 25th | Non-Booking Regret 50th | Non-Booking Regret 75th |
|---|---|---|
| $2.51 | $5.48 | $9.94 |

The result is about 60% accuracy on both the booking case and the non-booking case.

Other metrics may also be of interest, such as a portion of correctly "classified" bookings, a portion of correctly "classified" non-bookings, and so forth. A single metric, however, may be used to guide the optimization to select parameters and 75th percentile of booking regret will be used in the examples described herein. Nevertheless, some other metrics will be discussed below.

Two modeling approaches are next described. The first modeling approach is a booking session constrained modeling approach, and the second is a payoff maximization modeling approach.

The booking constrained modeling approach may comprise a hard margin (e.g., all of the constraints should be satisfied) or a soft margin (constraints may be relaxed to allow the constraints to be satisfied). For the hard margin approach, each booking session has one booked listing and one or more viewed but unbooked listings. In this approach, the following constraints are used:

$RP(x_{booked}) >= P_{booked}$ $RP(x_{unbooked}) <= P_{unbooked} - 1$

Where the first equation indicates that the client reservation value for the booked listing is greater than or equal to the price of the booked listing (e.g., the client reservation value is not less than the price booked). The second equation indicates that the client reservation value of the unbooked listing is less than the unbooked listing price. Continuing with the simple example of a booking session with booked listing A, and unbooked listings B, and C from above:

$w^T(x_g, x_A, X_n) >= P_{booked}$ $w^T(x_g, x_B, x_n) <= P_{unbooked} - 1$ $w^T(x_g, x_C, x_n) <= P_{unbooked} - 1$ Accordingly, the following linear constrained programming may be used:

$$\min \tfrac{1}{2}\|w\|^2$$

$$\text{s.t. } RP(x\text{booked}) >= P\text{booked}$$

$$RP(x\text{unbooked}) <= P\text{unbooked} - 1$$

$$RP(x) >= 0$$

Where $RP(x) >= 0$ indicates that a reservation value is not negative.

For the booking constrained modeling soft margin approach, slack variables are added to relax the constraints, to address the possibility that the optimization problem may not have a feasible solution. The slack variables are added to relax the constraints as follows:

$$\min \tfrac{1}{2}\|w\|^2 + \lambda \sum_i e_i$$

$$\text{s.t. } RP(x_{booked}) >= P_{booked} - e_{booked}$$

$$RP(x_{unbooked}) <= P_{unbooked} - 1 + e_{unbooked}$$

$$RP(x) >= 0$$

$$\forall i, ei >= 0$$

A validation set may be needed to pick best λ using this metric. For example, if lambda=1, 0.1, 0.01 is tested, then the optimization program above will be run three times for each of the lambda. Therefore, there will be three different models. A new dataset will be used (e.g., called a validation set since this is the dataset that is different from the training set that is used to run the optimization program). On the validation set, the performance of those three model will be analyzed using the metric defined above (e.g., 75th percentile of booking regret), and/or other metrics discussed above. As an example, the model produced using lambda=0.1 might give the lowest booking regret, and this model would be chosen to use in the production.

As explained above, a second modeling approach is a payoff maximization modeling approach. In this approach, it is assumed that for each booking session, the booking listing maximizes the client's payoff. Thus, this is a different assumption than used for booking session constrained modeling approach. The payoff maximization modeling approach also may comprise a hard margin or a soft margin. In the payoff maximization modeling approach, the optimization problem is formulated as follows for the hard margin approach:

$$\min \tfrac{1}{2}\|w\|^2$$

$$\text{s.t. } RP(x_{booked}) >= P_{booked}$$

$$\forall \text{session } s, RP(x_{booked}) - P_{booked} >= RP(x_{unbooked}) - P_{unbooked}$$

$$RP(x) >= 0$$

$$\forall i, e_i >= 0$$

Where s.t. $RP(x_{booked}) >= P_{booked}$ indicates that the client reservation value is not less than the actual booked listing price, and $\forall \text{session } s, RP(x_{booked}) - P_{booked} >= RP(x_{unbooked}) - P_{unbooked}$ indicates that the payoff for the booked listing (e.g., $RP(x_{booked}) - P_{booked}$) is not less than the payoff of the unbooked listings (e.g., $RP(x_{unbooked}) - P_{unbooked}$). The main difference is that now multiple listings in a booking session are allowed to have a client reservation value larger than the listing price. This may be a more realistic case where clients are usually debating between listings at the end of the booking stage. For example, for listing A, B, and C:

| Listing | Listing Price | Client Reservation Value | Payoff |
|---------|--------------|--------------------------|--------|
| A | 100 | 200 | 100 |
| B | 50 | 60 | 10 |
| C | 70 | 90 | 20 |

In this example, the system would determine that the client would book listing A since it has a positive payoff and because its payoff is larger than each of the unbooked listings' payoff. In this approach, the unbooked listings may also have a positive payoff. This is different than the booking session constrained modeling approach where it is assumed that only the booked listing has a positive payoff.

In the payoff maximization modeling approach, the optimization problem is formulated as follows for the soft margin approach:

$$\min \tfrac{1}{2}\|w\|^2 + \lambda \sum_i e_i$$

$$\text{s.t. } RP(x_{booked}) >= P_{booked} - e_{booked}$$

$$\forall \text{session } s, RP(x_{booked}) - P_{booked} >= RP(x_{unbooked}) - P_{unbooked} - e_{session}$$

$$RP(x) >= 0$$

$$\forall i, ei >= 0$$

In one example, additional non-negative constraints on weights may be added. For example, having a feature such as WiFi is likely not to going hurt a client reservation value in a typical situation (e.g., the fact that a listing has WiFi as a feature, should not reduce a client reservation value since it is unlikely that a client will decide to not book a listing based on the fact that it has WiFi). Having such non-negative constraints on weights improves a model's intelligibility and can potentially produce a model with better fidelity. Accordingly, a constraint may be added for one or more features such that a weight for the particular feature (e.g., feature 3 for WiFi) should not go below zero (e.g., $w_3 >= 0$). Thus, the particular feature would not negatively affect the final client reservation value for that listing.

The one or more constraints used for the model may be predetermined and may be varied over time. For example, as the model gets smarter and starts to hone things, some constraints may be loosened or modified accordingly. Likewise, various features may be removed or added.

In operation 508, the server computing system calculates a set of weights using the training data, wherein each weight may be as small as possible while satisfying the most constraints as possible. Typically in machine learning, simple models are favored. Putting regularizations on the weights is an approach to prevent "overfitting." The set of weights comprises a weight associated with each feature in the plurality of feature vectors. For example, a weight for a first guest feature (e.g., client country) may be 0.5, a weight for a first night feature (e.g., Fourth of July holiday) may be 5, and a weight of a listing feature (e.g. WiFi) may be 1. These weights indicate that a client country may add $0.50 to a client reservation value, the fourth of July holiday may add $5, and WiFi may add $1.

FIG. 6 shows a table illustrating example features 602 and each example feature associated generated weight 604. For example, the feature dim_has_wireless_int (e.g., WiFi) has a weight of 1.34 (e.g., WiFi is worth $1.34). Another example is Friday and Saturday nights which are worth $14.56 and $14.40 respectively.

Figure 7:
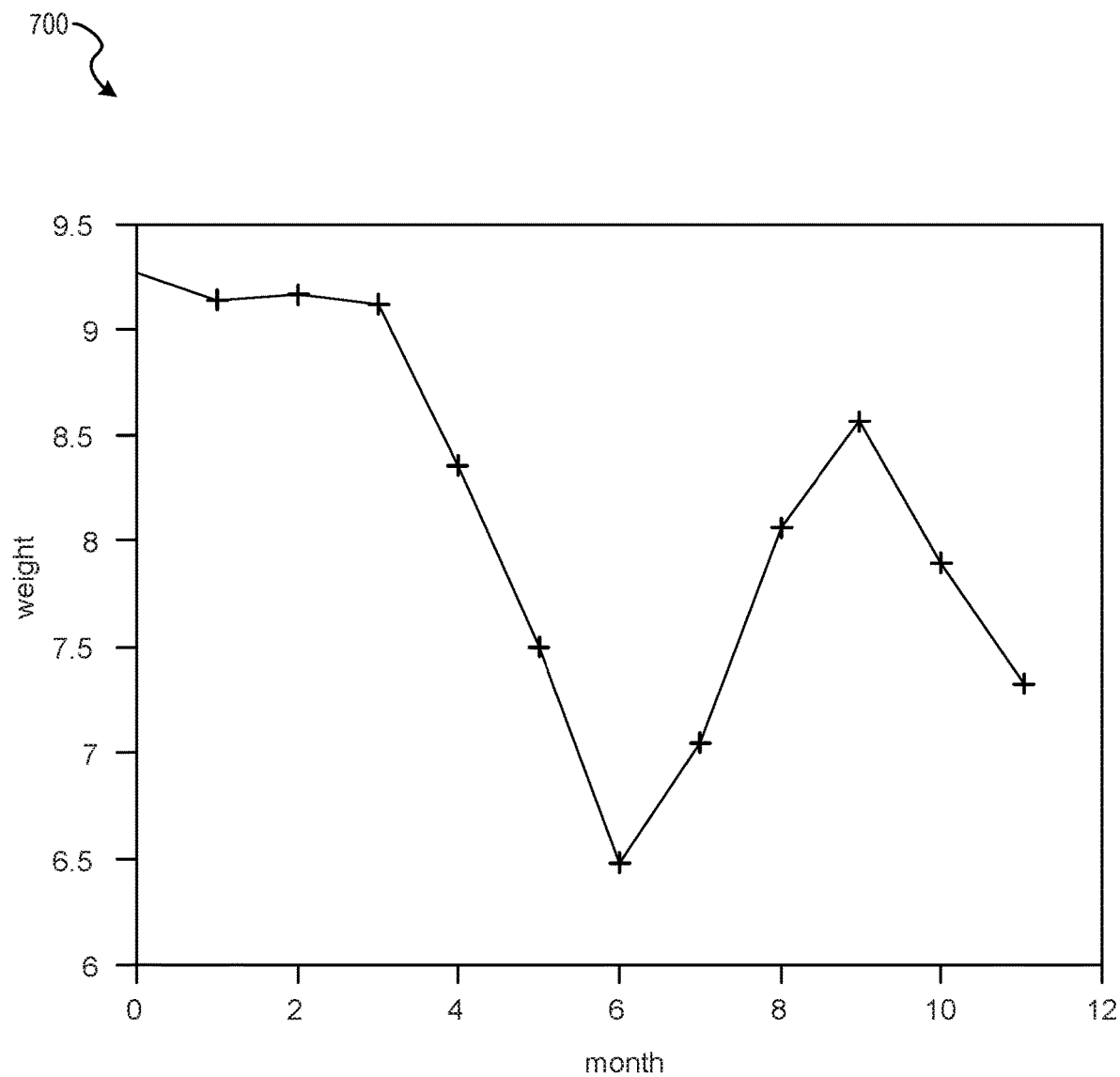
FIG. 7 is a graph illustrating weights per month for a particular listing, according to some example embodiments.
Figure 8:
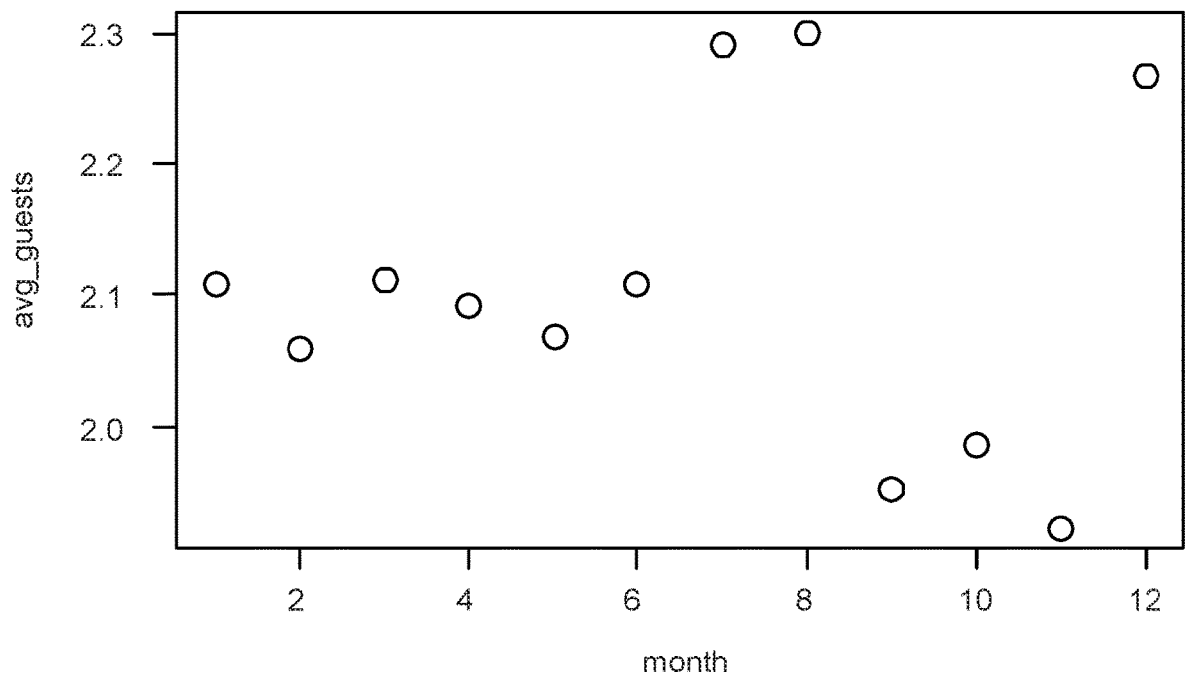
FIG. 8 is a graph illustrating an average number of clients per booking, according to some example embodiments.

FIG. 7 illustrates an example chart 700 that shows the weights for each month. The vertical axis in the chart 700 is the weight and the horizontal axis is the month. The client reservation value model is trained on value per client per night. Interestingly enough, the chart shows that July's weight is lower than that of other months, even though July is typically a high month for travel. However, looking at the average guests per booking for each month, it is interesting to see that July and August have the highest average number of guests per booking. This is shown in the chart 800 in FIG. 8 which illustrates the number of guests per booking, per month. As can be seen in the chart 800, people tend to travel with a lot of people in July and August.

Returning to FIG. 5, in operation 510, the server computing system computes a reservation value for each of a plurality of clients for each of a plurality of listings, and for each of a plurality of dates, based on the set of weights and the plurality of feature vectors. In one example, the server computing system executes a linear combination of the weights and the feature vector to generate a client reservation value for a particular client and listing and night.

Figure 9:
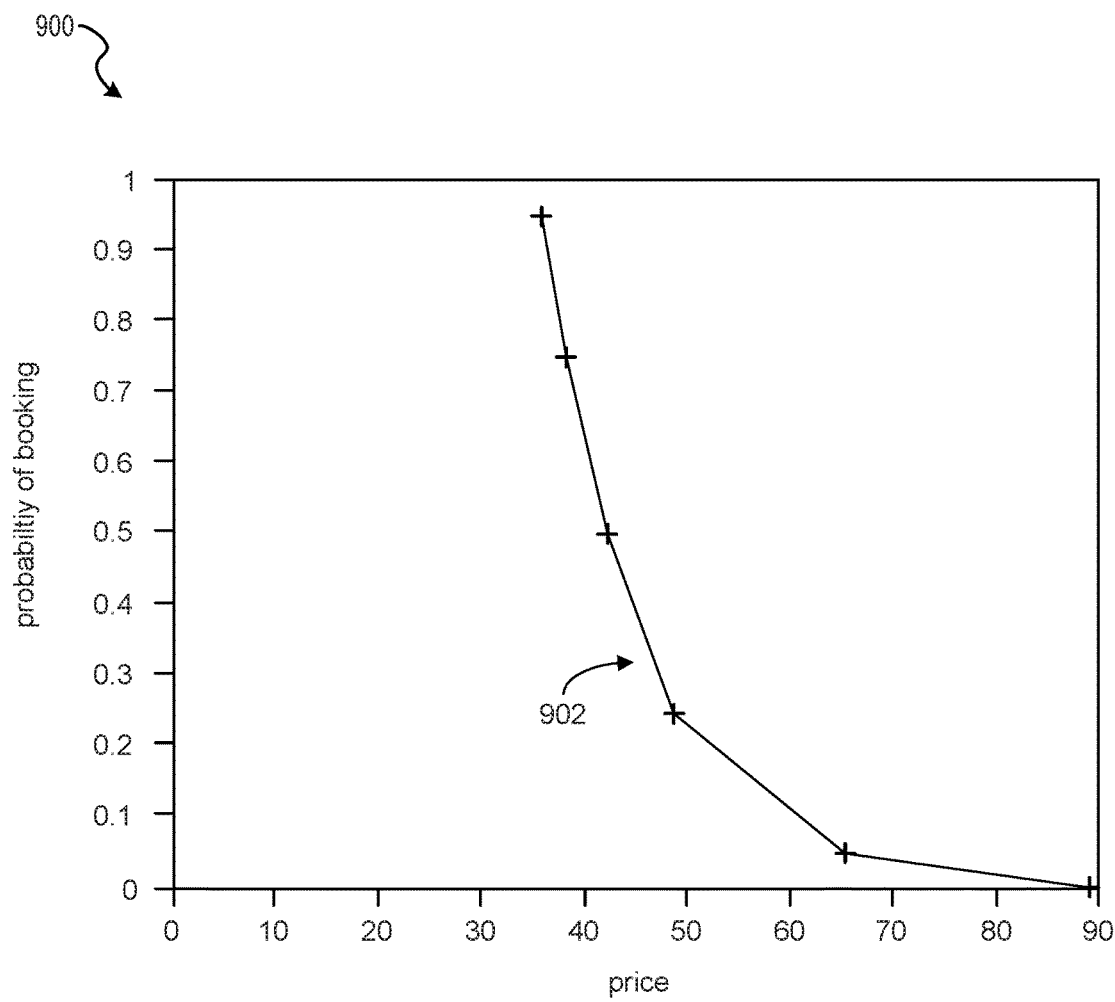
FIG. 9 is a graph illustrating a demand curve for a listing, according to some example embodiments.

As explained above, the computed client reservation values may be used to generate a demand curve. A demand curve may be used to determine an ideal pricing for a particular listing, in general, or for particular nights (e.g., weekdays, weekends, holidays, etc.), and so forth. FIG. 9 illustrates an example demand curve 900 for a particular listing (e.g., an apartment in San Francisco) on a particular date (e.g., Apr. 21, 2016). The demand curve generated by applying the client reservation value model, is shown as 902. All the client reservation values for the same listing on the same night (e.g., based on all of the clients that have viewed the listing) are aggregated to generate the demand curve 902. In this example, if the listing is priced at $50, there is a 0.25 (or 25%) probability the listing will be booked. The lower the price, the higher the probability the listing will be booked.

Also, the calculated weight for each feature may determine the value for that feature. This can further be used to provide suggestions or recommendation to a host or manager of a listing that if a particular feature is added to the listing, the listing will be worth a higher value. For example, instant booking is a feature that allows a client to instantly book a listing without having to be approved by the host or manager of the listing. From the model it may be determined that most people value instant booking at $6. Thus, the reservation system may suggest that the host add instant booking to the listing and may also increase the listing price to include the $6.

The model may also be used to generate listings for a particular search for listings inputted by a client. For example, the listings that have the highest client reservation value for a first client, may be displayed first (e.g., listings A, C, and F) in the search results for the client. A second client may do the same search, but get different results listed first (e.g., listings B, D, and G) because the second client may value particular features differently than the first client. In another example, the search results may not display listings that are above a client reservation value (or within a certain amount over the client reservation value). Accordingly, the systems and methods described herein allows a client to more easily access listings that are better suited to a particular client's needs or wants. In an online marketplace that has millions of listings, this may be particularly important to reduce the time for a client to book a listing, increase the chance the client will make actually make a booking, increase client satisfaction, and so forth.

In one example, the client may input search criteria into a user interface on a client device 110. The server system 102 may receive the search criteria and generate a list of listings that satisfy the search criteria. The server system 102 may then generate a client reservation value for the user, for each of the listings in the list of listings that satisfy the search criteria (e.g., based on the weighs calculated using the training data, as described above). The server system 102 may rank the listings based on the reservation value, such that the listings that have the highest reservation value are listed first. The server system 102 may return the search results comprising the ranked listings to the client device 110. The client device 110 may then display the ranked listings on the user interface of the client device 110.

The model may also be used to suggest a promotion that a host or manager of a listing may present to a particular client. For example, if a particular client is viewing the listing but the listing is $10 higher than the client's client reservation value, the system may suggest to the host of the listing that the host present a promotion for $10 off a night for that client. For example, the server system 102 may detect that the user is viewing a particular listing, generate a client reservation value for that listing (as described above) and if the server system 102 determines that the client reservation value is higher than the listed price for the listing, the server system 102 may send a message to the manager of the listing (e.g., via SMS, MMS, email, via an application, other means) suggesting a promotion price. The manager of the listing may accept (or modify) and send the promotion to the client via the server system 102 or other means.

The model may be periodically updated. For example, the training data may be updated regularly (e.g., booking session data for an updated time period), the constraints may be loosed, tightened, removed, or new ones added, and so forth.

The following examples describe various embodiments of methods, machine-readable media, and systems (e.g., machines, devices, or other apparatus) discussed herein.

EXAMPLE 1

A method, comprising:

analyzing, by a server computing system, booking session data to generate a plurality of feature vectors for each booking session of a plurality of booking sessions, wherein each booking session of the plurality of booking sessions comprises at least a first listing and a second listing;

generating, by the server computing system, training data comprising the plurality of feature vectors for each booking session, at least a first constraint where a reservation value associated with a feature vector for a booked listing is not less than an actual booked value, and at least a second constraint wherein a reservation value associated with a feature vector for an unbooked listing is greater than a listed value of the unbooked listing;

calculating, by the server computing system, a set of weights using the training data, wherein each weight of the set of weights is a lowest weight satisfying the most constraints possible, wherein the set of weights comprises a weight associated with each feature in the plurality of feature vectors; and computing, by the server computing system, a reservation value for each of a plurality of clients for each of a plurality of listings and for each date of a plurality of dates, based on the set of weights and the plurality of feature vectors.

EXAMPLE 2

A method according to example 1, wherein the first booking is a booked listing and the second listing is an unbooked listing.

EXAMPLE 3

A method according to any of the previous examples, wherein generating a plurality of feature vectors for each booking session of the plurality of booking sessions comprises:
generating a feature vector for the booked listing; and generating a feature vector for the at least one unbooked listing.

EXAMPLE 4

A method according to any of the previous examples, wherein each feature vector includes a plurality of features related to at least one of a group comprising: client features, night features, listing features, and manager features.

EXAMPLE 5

A method according to any of the previous examples, wherein computing a reservation value for each user of a plurality of users for each listing of a plurality of listings and for each date of a plurality of dates, based on the set of weights and the plurality of feature vectors, comprises:
performing a linear combination of the weights and the feature vector.

EXAMPLE 6

A method according to any of the previous examples, wherein at least one feature of the features in the plurality of feature vectors is associated with a non-negative constraint.

EXAMPLE 7

A method according to any of the previous examples, wherein the set of weights are further calculated using slack variables to soften the constraints where necessary to satisfy the constraints.

EXAMPLE 8

A method according to any of the previous examples, further comprising:
storing the snapshot of booking session data in one or more data stores.

EXAMPLE 9

A method according to any of the previous examples, wherein before analyzing the booking session data, the method further comprises:
capturing, by a server computing system, a snapshot of booking session data comprising booking session data from a plurality of booking sessions.

EXAMPLE 10

A method according to any of the previous examples, further comprising:

generating a demand curve for a particular listing based on the computed reservation value for a plurality of clients for a particular date.

EXAMPLE 11

A server computer comprising:
at least one processor; and
a computer-readable medium coupled with the at least one processor, the computer-readable medium comprising instructions stored thereon that are executable by the at least one processor to cause the server computer to perform operations comprising:
analyzing booking session data to generate a plurality of feature vectors for each booking session of the plurality of booking sessions, wherein each booking session of the plurality of booking sessions comprises at least a first listing and a second listing;
generating training data comprising the plurality of feature vectors for each booking session, at least a first constraint where a reservation value associated with a feature vector for a booked listing is not less than an actual booked value, and at least a second constraint wherein a reservation value associated with a feature vector for an unbooked listing is greater than a listed value of the unbooked listing;
calculating a set of weights using the training data, wherein each weight of the set of weights is a lowest weight satisfying the most constraints possible, wherein the set of weights comprises a weight associated with each feature in the plurality of feature vectors; and
computing a reservation value for each of a plurality of clients for each of a plurality of listings and for each date of a plurality of dates, based on the set of weights and the plurality of feature vectors.

EXAMPLE 12

A server computer according to any of the previous examples, wherein the first booking is a booked listing and the second listing is an unbooked listing, and wherein generating a plurality of feature vectors for each booking session of the plurality of booking sessions comprises:
generating a feature vector for the booked listing; and generating a feature vector for the at least one unbooked listing.

EXAMPLE 13

A server computer according to any of the previous examples, wherein each feature vector includes a plurality of features related to at least one of a group comprising: client features, night features, listing features, and manager features.

EXAMPLE 14

A server computer according to any of the previous examples, wherein computing the reservation value for each user of the plurality of users for each listing of the plurality of listings and for each date of the plurality of dates, based on the set of weights and the plurality of feature vectors, comprises:

performing a linear combination of the weights and the feature vector.

EXAMPLE 15

A server computer according to any of the previous examples, wherein at least one feature of the features in the plurality of feature vectors is associated with a non-negative constraint.

EXAMPLE 16

A server computer according to any of the previous examples, wherein the set of weights are further calculated using slack variables to soften the constraints where necessary to satisfy the constraints.

EXAMPLE 17

A server computer according to any of the previous examples, the operations further comprising:
storing the snapshot of booking session data in one or more data stores.

EXAMPLE 18

A server computer according to any of the previous examples, wherein before analyzing the booking session data, the operations further comprise:
capturing, by the server computing system, a snapshot of booking session data comprising booking session data from a plurality of booking sessions.

EXAMPLE 19

A server computer according to any of the previous examples, the
operations further comprising:
generating a demand curve for a particular listing based on the computed reservation value for a plurality of clients for a particular date.

EXAMPLE 20

A non-transitory computer-readable medium comprising instructions stored thereon that are executable by at least one processor to cause a computing device associated with a first data owner to perform operations comprising:
analyzing booking session data to generate a plurality of feature vectors for each booking session of the plurality of booking sessions, wherein each booking session of the plurality of booking sessions comprises at least a first listing and a second listing;
generating training data comprising the plurality of feature vectors for each booking session, at least a first constraint where a reservation value associated with a feature vector for a booked listing is not less than an actual booked value, and at least a second constraint wherein a reservation value associated with a feature vector for an unbooked listing is greater than a listed value of the unbooked listing;
calculating a set of weights using the training data, wherein each weight of the set of weights is a lowest weight satisfying the most constraints possible, wherein the set of weights comprises a weight associated with each feature in the plurality of feature vectors; and
computing a reservation value for each of a plurality of clients for each of a plurality of listings and for each date of a plurality of dates, based on the set of weights and the plurality of feature vectors.

Figure 10:
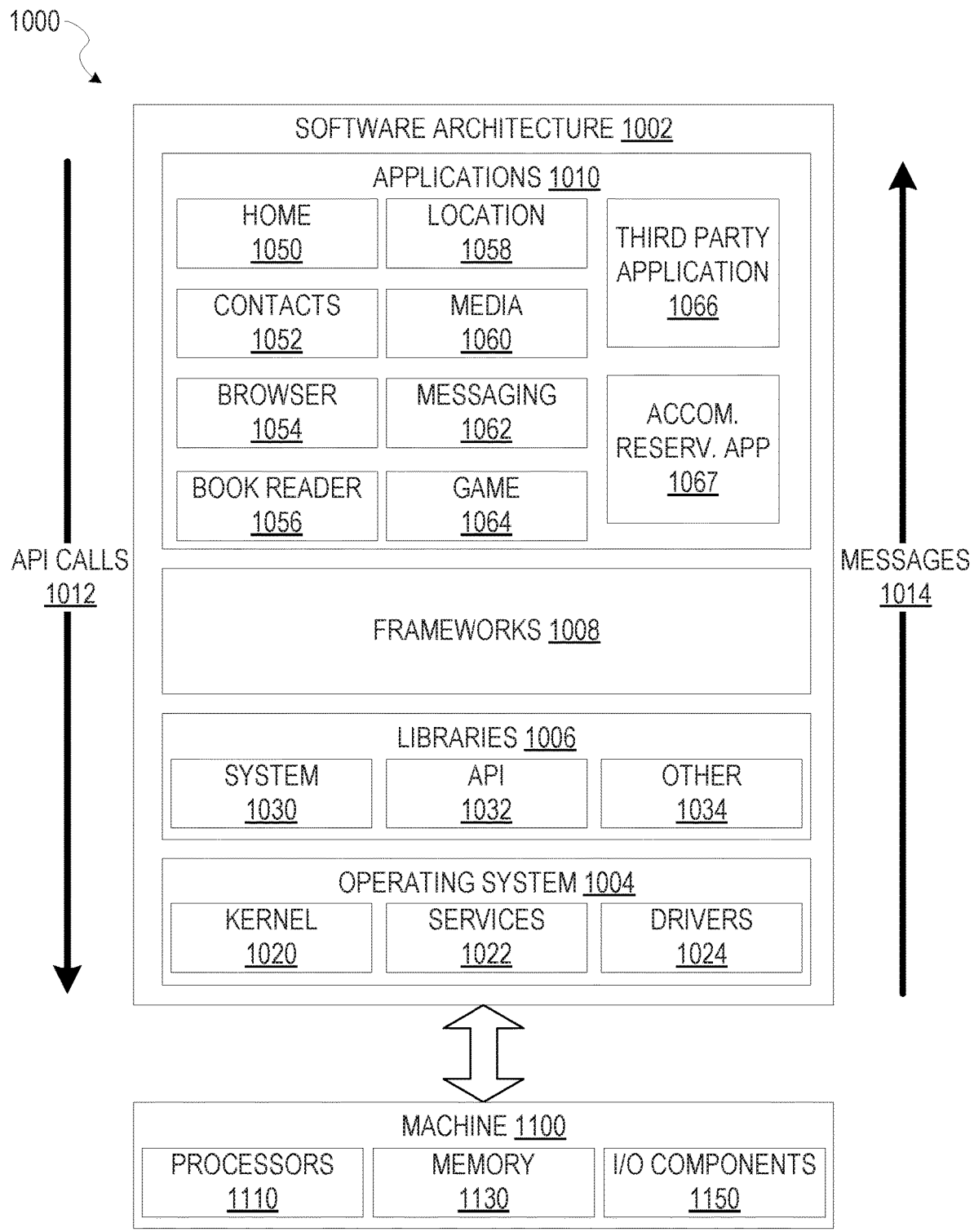
FIG. 10 is a block diagram illustrating an example of a software architecture that may be installed on a machine, according to some example embodiments.

FIG. 10 is a block diagram 1000 illustrating software architecture 1002, which can be installed on any one or more of the devices described above. For example, in various embodiments, client devices 110 and server systems 130, 102, 120, 122, 124, and 128 may be implemented using some or all of the elements of software architecture 1002. FIG. 10 is merely a non-limiting example of a software architecture, and it will be appreciated that many other architectures can be implemented to facilitate the functionality described herein. In various embodiments, the software architecture 1002 is implemented by hardware such as machine 1100 of FIG. 11 that includes processors 1110, memory 1130, and I/O components 1150. In this example, the software architecture 1002 can be conceptualized as a stack of layers where each layer may provide a particular functionality. For example, the software architecture 1002 includes layers such as an operating system 1004, libraries 1006, frameworks 1008, and applications 1010. Operationally, the applications 1010 invoke application programming interface (API) calls 1012 through the software stack and receive messages 1014 in response to the API calls 1012, consistent with some embodiments.

In various implementations, the operating system 1004 manages hardware resources and provides common services. The operating system 1004 includes, for example, a kernel 1020, services 1022, and drivers 1024. The kernel 1020 acts as an abstraction layer between the hardware and the other software layers, consistent with some embodiments. For example, the kernel 1020 provides memory management, processor management (e.g., scheduling), component management, networking, and security settings, among other functionality. The services 1022 can provide other common services for the other software layers. The drivers 1024 are responsible for controlling or interfacing with the underlying hardware, according to some embodiments. For instance, the drivers 1024 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1006 provide a low-level common infrastructure utilized by the applications 1010. The libraries 1006 can include system libraries 1030 (e.g., C standard library) that can provide functions such as memory allocation functions, string manipulation functions, mathematic functions, and the like. In addition, the libraries 1006 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1006 can also include a wide variety of other libraries 1034 to provide many other APIs to the applications 1010.

The frameworks 1008 provide a high-level common infrastructure that can be utilized by the applications 1010, according to some embodiments. For example, the frameworks 1008 provide various graphic user interface (GUI) functions, high-level resource management, high-level location services, and so forth. The frameworks 1008 can provide a broad spectrum of other APIs that can be utilized by the applications 1010, some of which may be specific to a particular operating system 1004 or platform.

In an example embodiment, the applications 1010 include a home application 1050, a contacts application 1052, a browser application 1054, a book reader application 1056, a location application 1058, a media application 1060, a messaging application 1062, a game application 1064, and a broad assortment of other applications such as a third party applications 1066. According to some embodiments, the applications 1010 are programs that execute functions defined in the programs. Various programming languages can be employed to create one or more of the applications 1010, structured in a variety of manners, such as object-oriented programming languages (e.g., Objective-C, Java, or C++) or procedural programming languages (e.g., C or assembly language). In a specific example, the third party application 1066 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1066 can invoke the API calls 1012 provided by the operating system 1004 to facilitate functionality described herein.

Some embodiments may particularly include an accommodation reservation application 1067, which may be any application that requests data or other tasks to be performed by systems and servers described herein, such as server system 102, third party servers 130, and so forth. In certain embodiments, this may be a stand-alone application that operates to manage communications with a server system such as third party servers 130 or server system 102. In other embodiments, this functionality may be integrated with another application. The accommodation reservation application 1067 may request and display various data related to an online accommodation marketplace and may provide the capability for a user 106 to input data related to the system via voice, a touch interface, a keyboard, or using a camera device of machine 1100, communication with a server system via I/O components 1150, and receipt and storage of object data in memory 1130. Presentation of information and user inputs associated with the information may be managed by accommodation reservation application 1067 using different frameworks 1008, library 1006 elements, or operating system 1004 elements operating on a machine 1100.

Figure 11:
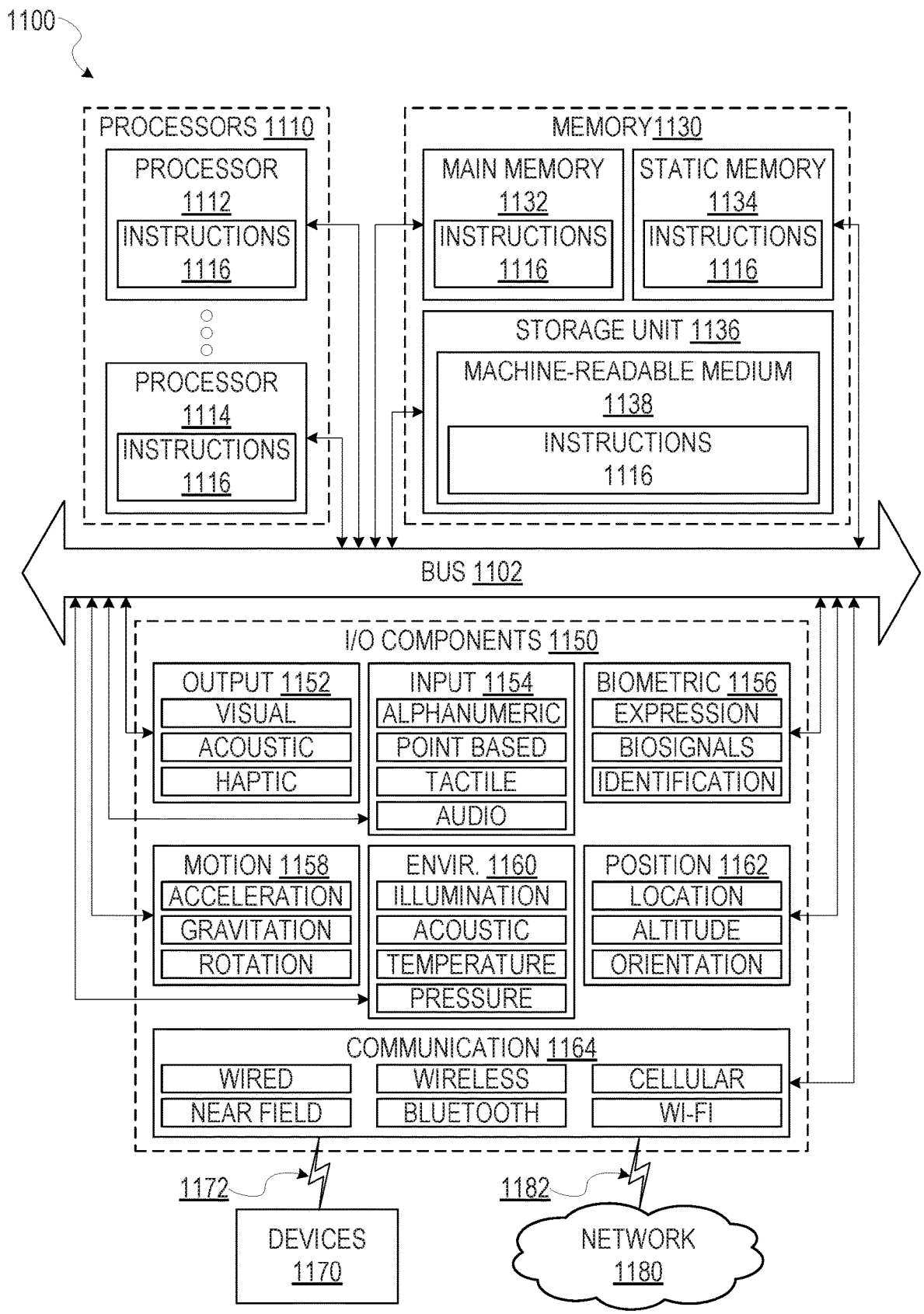
FIG. 11 illustrates a diagrammatic representation of a machine, in the form of a computer system, within which a set of instructions may be executed for causing the machine to perform any one or more of the methodologies discussed herein, according to an example embodiment.

FIG. 11 is a block diagram illustrating components of a machine 1100, according to some embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1116 (e.g., software, a program, an application 1010, an applet, an app, or other executable code) for causing the machine 1100 to perform any one or more of the methodologies discussed herein can be executed. In alternative embodiments, the machine 1100 operates as a stand-alone device or can be coupled (e.g., networked) to other machines. In a networked deployment, the machine 1100 may operate in the capacity of a server machine 130, 102, 120, 122, 124, 128 and the like, or a client device 110 in a server-client network environment, or as a peer machine in a peer-to-peer (or distributed) network environment. The machine 1100 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1116, sequentially or otherwise, that specify actions to be taken by the machine 1100. Further, while only a single machine 1100 is illustrated, the term "machine" shall also be taken to include a collection of machines 1100 that individually or jointly execute the instructions 1116 to perform any one or more of the methodologies discussed herein.

In various embodiments, the machine 1100 comprises processors 1110, memory 1130, and I/O components 1150, which can be configured to communicate with each other via a bus 1102. In an example embodiment, the processors 1110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1112 and a processor 1114 that may execute the instructions 1116. The term "processor" is intended to include multi-core processors 1110 that may comprise two or more independent processors 1112, 1114 (also referred to as "cores") that can execute instructions 1116 contemporaneously. Although FIG. 11 shows multiple processors 1110, the machine 1100 may include a single processor 1110 with a single core, a single processor 1110 with multiple cores (e.g., a multi-core processor 1110), multiple processors 1112, 1114 with a single core, multiple processors 1112, 1114 with multiple cores, or any combination thereof.

The memory 1130 comprises a main memory 1132, a static memory 1134, and a storage unit 1136 accessible to the processors 1110 via the bus 1102, according to some embodiments. The storage unit 1136 can include a machine-readable medium 1138 on which are stored the instructions 1116 embodying any one or more of the methodologies or functions described herein. The instructions 1116 can also reside, completely or at least partially, within the main memory 1132, within the static memory 1134, within at least one of the processors 1110 (e.g., within the processor's cache memory), or any suitable combination thereof, during execution thereof by the machine 1100. Accordingly, in various embodiments, the main memory 1132, the static memory 1134, and the processors 1110 are considered machine-readable media 1138.

As used herein, the term "memory" refers to a machine-readable medium 1138 able to store data temporarily or permanently and may be taken to include, but not be limited to, random-access memory (RAM), read-only memory (ROM), buffer memory, flash memory, and cache memory. While the machine-readable medium 1138 is shown, in an example embodiment, to be a single medium, the term "machine-readable medium" should be taken to include a single medium or multiple media (e.g., a centralized or distributed database, or associated caches and servers) able to store the instructions 1116. The term "machine-readable medium" shall also be taken to include any medium, or combination of multiple media, that is capable of storing instructions (e.g., instructions 1116) for execution by a machine (e.g., machine 1100), such that the instructions 1116, when executed by one or more processors of the machine 1100 (e.g., processors 1110), cause the machine 1100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1150 include a wide variety of components to receive input, provide output, produce output, transmit information, exchange information, capture measurements, and so on. In general, it will be appreciated that the I/O components 1150 can include many other components that are not shown in FIG. 11. The I/O components 1150 are grouped according to functionality merely for simplifying the following discussion, and the grouping is in no way limiting. In various example embodiments, the I/O components 1150 include output components 1152 and input components 1154. The output components 1152 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1154 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1150 include biometric components 1156, motion components 1158, environmental components 1160, or position components 1162, among a wide array of other components. For example, the biometric components 1156 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1158 include acceleration sensor components (e.g., accelerometer), gravitation sensor components, rotation sensor components (e.g., gyroscope), and so forth. The environmental components 1160 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1162 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1150 may include communication components 1164 operable to couple the machine 1100 to a network 1180 or devices 1170 via a coupling 1182 and a coupling 1172, respectively. For example, the communication components 1164 include a network interface component or another suitable device to interface with the network 1180. In further examples, communication components 1164 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1170 may be another machine 1100 or any of a wide variety of peripheral devices (e.g., a peripheral device coupled via a Universal Serial Bus (USB)).

Moreover, in some embodiments, the communication components 1164 detect identifiers or include components operable to detect identifiers. For example, the communication components 1164 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF 417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1164, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1180 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1180 or a portion of the network 1180 may include a wireless or cellular network, and the coupling 1182 may be a Code Division Multiple Access (CDMA) connection, a Global System for Mobile communications (GSM) connection, or another type of cellular or wireless coupling. In this example, the coupling 1182 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1116 are transmitted or received over the network 1180 using a transmission medium via a network interface device (e.g., a network interface component included in the communication components 1164) and utilizing any one of a number of well-known transfer protocols (e.g., Hypertext Transfer Protocol (HTTP)). Similarly, in other example embodiments, the instructions 1116 are transmitted or received using a transmission medium via the coupling 1172 (e.g., a peer-to-peer coupling) to the devices 1170. The term "transmission medium" shall be taken to include any intangible medium that is capable of storing, encoding, or carrying the instructions 1116 for execution by the machine 1100, and includes digital or analog communications signals or other intangible media to facilitate communication of such software.

Furthermore, the machine-readable medium 1138 is non-transitory (in other words, not having any transitory signals) in that it does not embody a propagating signal. However, labeling the machine-readable medium 1138 "non-transitory" should not be construed to mean that the medium is incapable of movement; the medium 1138 should be considered as being transportable from one physical location to another. Additionally, since the machine-readable medium 1138 is tangible, the medium 1138 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
retrieving, by a server computing system, booking session data in an online marketplace, the booking session data comprising a plurality of booking sessions associated with a plurality of listings in the online marketplace;
generating, by the server computing system from the booking session data in the online marketplace, feature vectors for each booking session of a plurality of booking sessions, by:
generating a booked feature vector for a booked listing that was booked by a respective client during the booking session, the booked feature vector comprising features corresponding to the respective client, features corresponding to a date of the booked listing, and features corresponding to the booked listing;
selecting at least one unbooked listing that was viewed by but not booked by the respective client during the booking session, based on a number of times the at least one unbooked listing was viewed by the respective client; and
generating an unbooked feature vector for the at least one unbooked listing that was viewed by but not booked by the respective client during the booking session, the unbooked feature vector comprising features corresponding to the respective client, feature corresponding to a date of the booked listing, and features corresponding to the at least one unbooked listing;
generating, by the server computing system, training data for a machine learning model comprising the feature vectors, including the booked feature vector at the at least one unbooked feature vector, for each booking session;
training, by the server computer system, the machine learning model using the training data and at least a first constraint where a reservation value associated with a feature vector for a booked listing is not less than an actual booked value, and at least a second constraint wherein a reservation value associated with a feature vector for an unbooked listing is greater than a listed value of the unbooked listing, to generate a trained machine learning model;

computing, by the server computing system using the trained machine learning model, a reservation value for each of a plurality of clients for each of a plurality of listings and for each date of a plurality of dates, the reservation value indicating a highest price a respective client will pay for a particular listing on a particular date;

receiving, by the server computing system from a client device associated, search criteria for listings in the online marketplace;

generating, by the server computing system, a list of listings that satisfy the search criteria;

ranking, by the server computing system, the listings based on the respective reservation value for each listing; and returning, by the server computing system, the ranked listings to the client device to be displayed in ranked order on a user interface of the client device.

2. The method of claim 1, wherein computing a reservation value for each user of a plurality of users for each listing of a plurality of listings and for each date of a plurality of dates, is based on a set of weights and the feature vectors, and further comprises:
performing a linear combination of the weights and the feature vectors.

3. The method of claim 1, wherein at least one feature of the features in the feature vectors is associated with a non-negative constraint.

4. The method of claim 1, wherein training the machine learning model further comprises:
calculating a set of weights using the training data, wherein each weight of the set of weights is a lowest weight satisfying the most constraints possible, the set of weights comprising a weight associated with each feature in the feature vectors; and
wherein the set of weights are further calculated using slack variables to soften the constraints where necessary to satisfy the constraints.

5. The method of claim 1, further comprising:
storing a snapshot of booking session data in one or more data stores.

6. The method of claim 1, wherein before retrieving the booking session data, the method comprises:
capturing a snapshot of booking session data comprising booking session data from a plurality of booking sessions.

7. The method of claim 1, further comprising:
generating a demand curve for a particular listing based on the computed reservation value for a plurality of clients for a particular date.

8. The method of claim 1, wherein the at least one unbooked listing is included in the respective booking session based on the number of times the respective client viewed the unbooked listing or based on determining that the respective client viewed the unbooked listing within a predefined time of booking the booked listing.

9. The method of claim 1, further comprising:
detecting that a listing is being viewed by a user on a first computing device;
determining that the reservation value of the listing is lower than the listed price for the listing;
sending a message to a second computing device corresponding to a manager of the listing indicating a new price to be offered to the user; and
detecting selection of the new price to be offered and sending the new price to the first computing device.

10. The method of claim 1, further comprising:
retrieving updated booking session data in the online marketplace;
generating updated feature vectors for each booking session of booking sessions in the updated booking session data;
generating updated training data for the machine learning model comprising the updated feature vectors; and
training the machine learning model using the updated training data.

11. A server computer comprising:
at least one processor; and
a computer-readable medium coupled with the at least one processor, the computer-readable medium comprising instructions stored thereon that are executable by the at least one processor to cause the server computer to perform operations comprising:
retrieving booking session data in an online marketplace, the booking session data comprising a plurality of booking sessions associated with a plurality of listings in the online marketplace;
generating, from the booking session data in the online marketplace, feature vectors for each booking session of a plurality of booking sessions, by:
generating a booked feature vector for a booked listing that was booked by a respective client during the booking session, the booked feature vector comprising features corresponding to the respective client, features corresponding to a date of the booked listing, and features corresponding to the booked listing;
selecting at least one unbooked listing that was viewed by but not booked by the respective client during the booking session, based on a number of times the at least one unbooked listing was viewed by the respective client; and
generating an unbooked feature vector for the at least one unbooked listing that was viewed by but not booked by the respective client during the booking session, the unbooked feature vector comprising features corresponding to the respective client, feature corresponding to a date of the booked listing, and features corresponding to the at least one unbooked listing;
generating training data for a machine learning model comprising the feature vectors, including the booked feature vector at the at least one unbooked feature vector, for each booking session;
training the machine learning model using the training data and at least a first constraint where a reservation value associated with a feature vector for a booked listing is not less than an actual booked value, and at least a second constraint wherein a reservation value associated with a feature vector for an unbooked listing is greater than a listed value of the unbooked listing, to generate a trained machine learning model;
computing, using the trained machine learning model, a reservation value for each of a plurality of clients for each of a plurality of listings and for each date of a plurality of dates, the reservation value indicating a highest price a respective client will pay for a particular listing on a particular date;
receiving, from a client device associated, search criteria for listings in the online marketplace;
generating a list of listings that satisfy the search criteria;
ranking the listings based on the respective reservation value for each listing; and returning the ranked listings to the client device to be displayed in ranked order on a user interface of the client device.

12. The server computer of claim 11, wherein computing a reservation value for each user of a plurality of users for each listing of a plurality of listings and for each date of a plurality of dates, is based on a set of weights and the feature vectors, and further comprises:
performing a linear combination of the weights and the feature vectors.

13. The server computer of claim 11, wherein at least one feature of the features in the feature vectors is associated with a non-negative constraint.

14. The server computer of claim 11, wherein training the machine learning model further comprises:
calculating a set of weights using the training data, wherein each weight of the set of weights is a lowest weight satisfying the most constraints possible, the set of weights comprising a weight associated with each feature in the plurality of feature vectors; and
wherein the set of weights are further calculated using slack variables to soften the constraints where necessary to satisfy the constraints.

15. The server computer of claim 11, the operations further comprising:
storing a snapshot of booking session data in one or more data stores.

16. The server computer of claim 11, wherein before retrieving the booking session data, the operations further comprise:
capturing a snapshot of booking session data comprising booking session data from a plurality of booking sessions.

17. The server computer of claim 11, the operations further comprising:
generating a demand curve for a particular listing based on the computed reservation value for a plurality of clients for a particular date.

18. The server computer of claim 11, the operations further comprising:
detecting that a listing is being viewed by a user on a first computing device;
determining that the reservation value of the listing is lower than the listed price for the listing;
sending a message to a second computing device corresponding to a manager of the listing indicating a new price to be offered to the user; and
detecting selection of the new price to be offered and sending the new price to the first computing device.

19. The server computer of claim 11, the operations further comprising:
retrieving updated booking session data in the online marketplace;
generating updated feature vectors for each booking session of booking sessions in the updated booking session data;
generating updated training data for the machine learning model comprising the updated feature vectors; and
training the machine learning model using the updated training data.

20. A non-transitory computer-readable medium comprising instructions stored thereon that are executable by at least one processor to cause a computing device associated with a first data owner to perform operations comprising:
retrieving booking session data in an online marketplace, the booking session data comprising a plurality of booking sessions associated with a plurality of listings in the online marketplace;
generating, from the booking session data in the online marketplace, feature vectors for each booking session of a plurality of booking sessions, by:
generating a booked feature vector for a booked listing that was booked by a respective client during the booking session, the booked feature vector comprising features corresponding to the respective client, features corresponding to a date of the booked listing, and features corresponding to the booked listing;
selecting at least one unbooked listing that was viewed by but not booked by the respective client during the booking session, based on a number of times the at least one unbooked listing was viewed by the respective client; and
generating an unbooked feature vector for the at least one unbooked listing that was viewed by but not booked by the respective client during the booking session, the unbooked feature vector comprising features corresponding to the respective client, feature corresponding to a date of the booked listing, and features corresponding to the at least one unbooked listing;
generating training data for a machine learning model comprising the feature vectors, including the booked feature vector at the at least one unbooked feature vector, for each booking session;
training the machine learning model using the training data and at least a first constraint where a reservation value associated with a feature vector for a booked listing is not less than an actual booked value, and at least a second constraint wherein a reservation value associated with a feature vector for an unbooked listing is greater than a listed value of the unbooked listing, to generate a trained machine learning model;
computing, using the trained machine learning model, a reservation value for each of a plurality of clients for each of a plurality of listings and for each date of a plurality of dates, the reservation value indicating a highest price a respective client will pay for a particular listing on a particular date;
receiving, from a client device associated, search criteria for listings in the online marketplace;
generating a list of listings that satisfy the search criteria;
ranking the listings based on the respective reservation value for each listing; and
returning the ranked listings to the client device to be displayed in ranked order on a user interface of the client device.

* * * * *